G. W. W. CORNMAN & R. P. BROWN.
PYROMETRY.
APPLICATION FILED JULY 1, 1918.

1,285,563.

Patented Nov. 19, 1918.
2 SHEETS—SHEET 1.

INVENTORS
George W W Cornman
Richard P. Brown
By Chambers & Hubbell
ATTORNEY

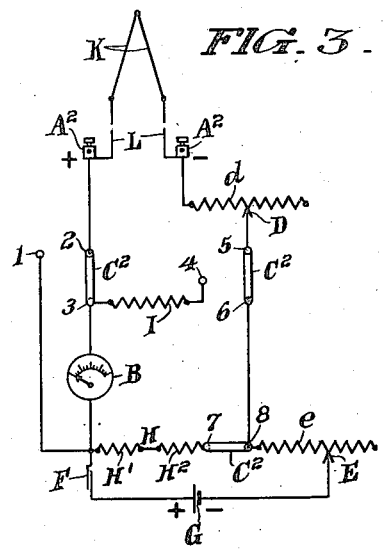
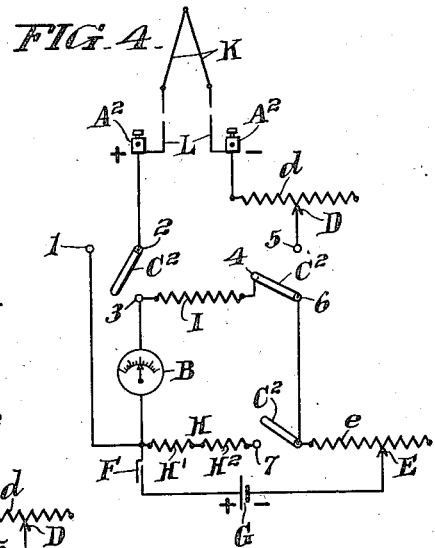
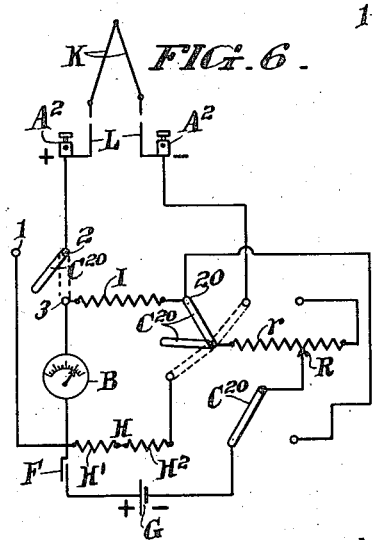
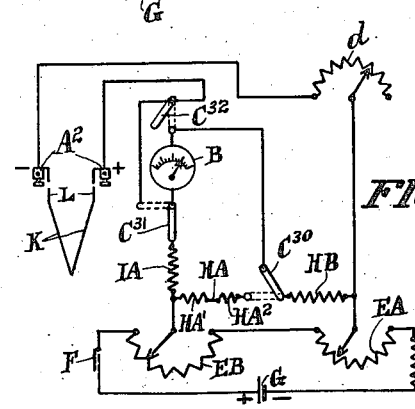
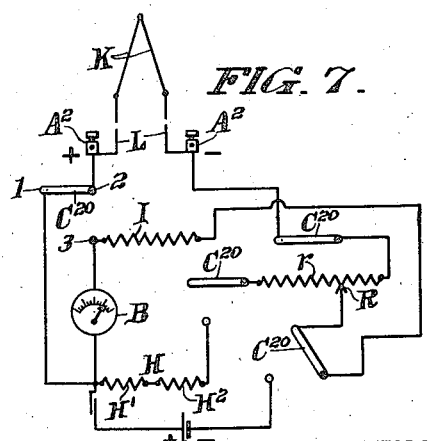

UNITED STATES PATENT OFFICE.

GEORGE W. W. CORNMAN AND RICHARD P. BROWN, OF PHILADELPHIA, PENNSYLVANIA, ASSIGNORS TO THE BROWN INSTRUMENT COMPANY, OF PHILADELPHIA, PENNSYLVANIA, A CORPORATION OF PENNSYLVANIA.

PYROMETRY.

1,285,563.  Specification of Letters Patent.  Patented Nov. 19, 1918.

Application filed July 1, 1918. Serial No. 242,974.

*To all whom it may concern:*

Be it known that we, GEORGE W. W. CORNMAN and RICHARD P. BROWN, both citizens of the United States of America, residing in the city and county of Philadelphia, in the State of Pennsylvania, have invented certain new and useful Improvements in Pyrometry, of which the following is a true and exact description, reference being had to the accompanying drawings, which form a part thereof.

The general object of our present invention is to provide an improved method of, and improved apparatus for determining temperatures by the use of a thermo-couple. More specifically, the object of our invention is to make it possible to obtain a direct and accurate measurement of the thermo-couple voltage by the aid of simple, compact and relatively substantial apparatus which comprises self contained provisions for the quick and easy calibration of the apparatus to compensate for the changes in resistance in the thermo-couple and connecting leads resulting from changes in temperature to which they are exposed, and which at each calibration will give an indirect measure of the thermo-couple voltage with a high degree of accuracy.

The various features of novelty which characterize our invention are pointed out with particularity in the claims annexed to and forming a part of this specification. For a better understanding of the invention, however, and its advantages, reference should be had to the accompanying drawings and descriptive matter in which we have illustrated and described a preferred embodiment of our invention.

Of the drawings:

Fig. 3 is a simplified diagram of the circuit connections of the apparatus shown in Fig. 1 in one adjustment or operative condition of the apparatus.

Figs. 4 and 5 are diagrams similar to Fig. 3, but illustrating 2nd and 3rd adjustments or operative conditions respectively of the apparatus.

Fig. 6 is a diagram of a slightly modified form of apparatus in one condition of operation.

Fig. 7 is a diagram which illustrates the apparatus of Fig. 6 in another condition of operation.

Fig. 8 is a diagram illustrating another modification of the apparatus.

Figure 1:
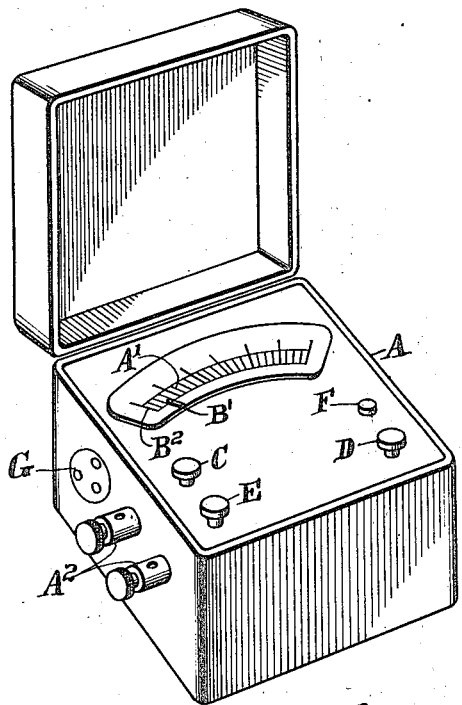
Figure 1 is a perspective view of a preferred form of apparatus devised and employed by us.

Our improved apparatus, in the form illustrated in Fig. 1, comprises a compact portable instrument A, within the casing of which is mounted a millvoltmeter, or like standard electric measuring device, B. The indicating needle B′ of the device B swings over the scale A′ provided on the face of the instrument A. The latter also comprises rotatable switches C, D and E, having handles or knobs projecting above the face of the instrument, and comprises resistance bodies $d$, $e$, H and I, and a dry cell G, or like source of current, and a push-button switch F for connecting the cell G into and out of circuit.

$A^2$ represents the binding posts to which the leads from the thermo-couple, used in conjunction with the instrument A, are attached.

Figure 2:
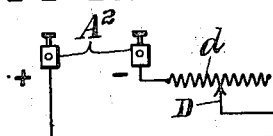
Fig. 2 is a diagrammatic representation of circuit arrangements of the apparatus shown in Fig. 1.
Figure 2:
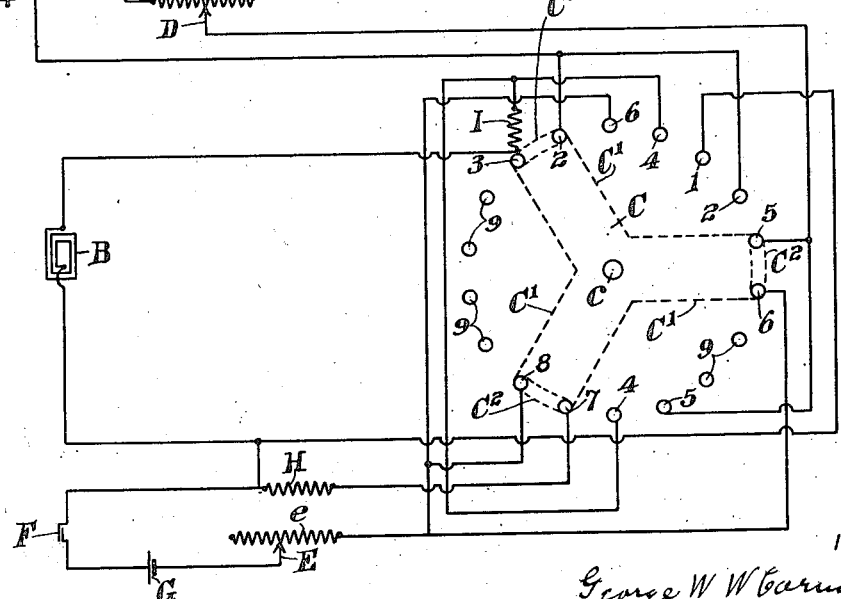

As shown in Fig. 2, the switch C comprises three arms C′, which may advantageously be formed of insulating material, and each one of which carries at its outer end a contact bridge or contact piece $C^2$, which is adapted to bear upon and sweep over contact studs 1 to 9, inclusive, which are arranged in a circular series about the axis of the switch C. Of these studs, those marked 9 perform no circuit-controlling functions, but the other studs form parts of electrical circuits as is hereinafter explained, or will be readily apparent from the diagrams. The switch D forms, in effect, the adjustable element of a rheostat, and regulates the amount of the variable resistance $d$ in circuit. The switch E forms the adjustable element of another rheostat and regulates the amount of the variable resistance $e$ in circuit. The resistance I may be similar in amount to, and perform the functions of the usual fixed resistance commonly employed in series with the winding of a millvoltmeter or analogous meter instrument. The resistance I, like an ordinary meter resistance, should have a negligible temperature coefficient. The resistance H should be equal in conductivity to the circuit portion formed by the resistance I and the windings of the meter B when the latter is connected in series with the resistance I, and should have the same temperature coefficient as this circuit portion. For this purpose when, as will ordinarily be the case, the meter winding is made of one material as copper, and the resistance I is made of a material such as the alloy known as manganin, having a different temperature coefficient, the resistance H is made in two sections H' and H², one of the same material and of the same resistance as the meter winding, and the other of the same material and resistance as the resistance I.

In the preferred mode of use of the apparatus shown in Figs. 1 and 2, the thermocouple K, which has its hot junction subjected to the temperature to be measured, is connected by the leads L to the binding posts A² of the instrument A as shown in Fig. 3, and the circuit connections of the latter are then adjusted to the conditions shown in Fig. 3. In this condition of the apparatus, one bridge piece C² of the switch C connects the contact studs 2 and 3, a second bridge piece C² connects the studs 5 and 6; and the third bridge piece C² connects the studs 7 and 8. This results in the formation of a circuit which is closed when the push button switch F is closed and which includes the dry cell G, the fixed resistance H, and the active portion of the variable resistance $e$. With the current conditions described the instrument B is in a circuit portion which forms a shunt about the resistance H, and also includes the thermo-couple K and any portion of the variable resistance $d$ which the setting of the switch D may happen to include in the circuit. The amount of the resistance $e$ in circuit is next adjusted by manipulation of the arm E, as required to make the drop in potential occurring in the resistance H exactly equal to the electro motive force of the thermo-couple K. When this equilibrium in potential is established, the meter B will show no current flow through the shunt circuit, for the positive side of the thermo-couple K and battery G are both connected to the same end of the resistance H.

As soon as the equilibrium is established the switch C is adjusted so that one bridge piece C² connects the contacts 4 and 6, while the other bridge pieces and contact studs are inactive. The effect of this change in the circuit connections is to disconnect the thermo-couple K from the circuit including the dry cell G, and to replace the resistance H in the closed circuit including the dry cell of Fig. 3 by the circuit portion of equal conductivity formed by the resistance I and the windings of the instrument B. In consequence the reading of the meter B then obtained is an exact measure of the electromotive force of the thermo-couple K at the instant at which said electro-motive force was balanced against the potential drop in the resistance H as described above. This follows from the fact that the current flow through the windings of the meter B in the condition of the apparatus shown in Fig. 4 must be the same as the current flow through the resistance H in the condition of the apparatus shown in Fig. 3.

By proceeding in the manner described the temperature to which the thermo-couple K was subjected at the instant at which the electromotive force of the couple K was balanced against the drop of potential in resistance H may be determined with the same accuracy with which it may be determined by the ordinary potentiometer method of determining the electromotive force of the thermo-couple K. With our invention, as with the ordinary potentiometer method, the electromotive force determination is entirely independent of variations in the resistance of the thermo-couple K, or the leads L connecting it to the instrument A, since at the instant at which the potential balance is established there is no current flow through the thermo-couple and its leads.

To obtain the direct indications of the variations in the temperature of the thermo-couple K, following any measurement of the temperature in the manner just described, the switch C is adjusted to cause one bridge piece C² to connect contact studs 1 and 2, and a second bridge piece C² to connect contact studs 4 and 5, while the third bridge piece C² is idle. In this condition of the apparatus which is illustrated in Fig. 5, the dry cell G, resistance H, and resistance $e$ are in open circuit, but the meter B, resistance I, and resistance $d$ are connected in series with one another and with the thermo-couple K. With the apparatus in this condition, the initial strength of the current flowing through the windings of the meter B should be equal to the strength of the current flowing through the meter windings when the apparatus is in the condition shown in Fig. 4, and the switch arc D is adjusted, as necessary, to bring this about by varying the amount of the resistance $d$ in circuit. It is to be understood that the various adjustments described should follow one another quickly enough so that no appreciable change in the temperature of the thermo-couple or its leads may occur between the instant of effecting the final adjustment referred to, and the instant at which the electromotive force of the thermo-couple K was balanced against the potential drop through the resistance H.

With the apparatus in the condition shown in Fig. 5, and adjusted in the manner last described, the meter B will give direct readings of the electromotive force of the thermo-couple K. While the accuracy of the readings obtained, following any one series of adjustments described, may be affected by subsequent changes in conditions of use, and particularly by changes in the temperature, and consequently the resistance of the thermo-couple K and the leads connecting it to the instrument A, the indications of temperature variation of the thermo-couple afforded by the instrument may be sufficiently accurate for many practical purposes, notwithstanding marked changes in the conditions of use. Moreover, the errors in the direct readings obtainable with the apparatus in the condition shown in Fig. 5 may be diminished to any desired extent by increasing the frequency with which the apparatus is recalibrated, so to speak, by running it through the cycle of circuit conditions and resistance adjustments described above, and each calibration or recalibration can be carried out very expeditiously, and does not require any great skill on the part of the operator.

The resistances, $d$ and $e$, of the apparatus illustrated in Figs. 1 to 5, inclusive, are never both needed in circuit at the same time. It is true that in the condition of the apparatus shown in Fig. 3 some or all of the resistance $d$ may be in circuit, but whether any or all of the resistance $d$ is then in circuit is quite immaterial. In consequence it is possible to employ a single resistance adjusting device in lieu of the resistance bodies $d$ and $e$, and their coöperative switch mechanisms.

One arrangement for accomplishing this is illustrated in Figs. 6 and 7, wherein $r$ represents the resistance body performing the functions of the resistance bodies $d$ and $e$ of Figs. 1 to 5, and R represents the switch mechanism for adjusting the amount of the resistance body $r$ in circuit.

The circuits illustrated by the full line showing in Fig. 6 correspond to those shown in Fig. 4, the portion of the resistance body $r$ to the left of the switch being then in circuit with the resistance I, source of current G and instrument B. With the switch mechanism adjusted to disconnect the left hand terminal of the resistance body $r$ from the right hand terminal of the resistance I, and to bring switch bridging pieces $C^{20}$ into the dotted line positions of Fig. 6, the circuits of Fig. 6 would then correspond in function to those shown in Fig. 3. Fig. 7 illustrates the circuit connections required to bring the apparatus of Fig. 6 into an operative relation corresponding to that illustrated in Fig. 5.

In Fig. 8 we have illustrated a modification of the wiring arrangement which we consider somewhat preferable from a practical standpoint to the wiring arrangements shown in Figs. 3 to 7, inclusive. In Fig. 8 the source of current G is included in a closed circuit including two resistances EA and EB. The shunt resistance formed by the resistances HA and HB is connected between adjustable contactors moving along the resistances EA and EB.

In the stage of operation of the apparatus of Fig. 8, corresponding to that of the apparatus first described, illustrated in Fig. 3, the switch $C^{30}$ connects the resistances HA and HB, the switch $C^{30}$ then being in its dotted line position, while switches $C^{31}$ and $C^{32}$ are in their full line positions. In this condition of the apparatus the resistances HA and HB jointly perform the function which resistance H performs when the apparatus first described is in the condition shown in Fig. 3.

In the second stage of operation of the apparatus shown in Fig. 8, corresponding to the stage of operation illustrated in Fig. 4, the switches $C^{30}$, $C^{31}$ and $C^{32}$ are in the full line positions shown in Fig. 8. It follows, therefore, that the resistance HA should be of the same magnitude and should have the same temperature characteristics as the portion of the circuit formed by the winding of the meter B and the instrument resistance IA. Preferably, therefore, the two sections HA' and HA² of the resistance HA are made of the same material as, and are equal in resistance to, the instrument resistance IA, and the winding of the meter B, respectively.

In the third stage of operation of the apparatus shown in Fig. 8, corresponding to the condition illustrated in Fig. 5, the switches $C^{30}$ and $C^{32}$ are in their full line positions and the switch $C^{31}$ is in its dotted line position.

While in accordance with the provisions of the statutes we have illustrated and described the best embodiments of our invention now known to us, it will be apparent to those skilled in the art that changes may be made in the form of the apparatus disclosed and in the particular manner of carrying out the described method without departing from the spirit of our invention, and we do not wish the claims hereinafter made to be limited to the particular embodiment of the invention specifically disclosed herein more than is made necessary by the terms of the claims and the prior state of the art.

Having now described our invention, what we claim as new and desire to secure by Letters Patent, is:

1. The method of determining the temperature condition to which a thermo-couple is subjected, which consists in first connecting said thermo-couple in shunt to a resistance forming part of a circuit in which the said resistance is connected in series with a source of current and with a variable resistance and adjusting the latter until the potential drop in the first mentioned resistance balances the electro-motive force of said couple; measuring the current flow through said circuit when said balance is obtained; and then connecting said thermo-couple in circuit with an electric measuring instrument and adjusting the resistance in said circuit to make the current flow through the circuit equal to that through the previously mentioned circuit when said potential balance referred to above is obtained; and thereafter determining the temperature condition to which said couple is then subjected from the indication of said instrument.

2. The method of determining the temperature condition to which a thermo-couple is subjected which consists in first connecting said thermo-couple in shunt to a resistance forming part of a circuit in which said resistance is connected in series with a source of current and a variable resistance, and adjusting the latter until the potential drop in the first mentioned resistance balances the electro-motive force of said couple; then substituting in said circuit for the first mentioned resistance a circuit portion which includes a current measuring instrument and is of a conductivity equal to that of the first mentioned resistance and measuring the current flow through said circuit; then connecting said instrument in circuit with said thermo-couple and with a variable resistance and adjusting the latter to make the current flow through the circuit equal to that measured in the preceding operation and thereafter determining a temperature condition to which said couple is then subjected from the indication of said instrument.

3. The method of determining the temperature condition to which a thermo-couple is subjected which consists in first connecting said thermo-couple in a shunt to a resistance forming part of a circuit in which said resistance is connected in series with a source of current and a variable resistance and adjusting the latter until the potential drop in the first mentioned resistance balances the electro-motive force of said couple said shunt including a current measuring instrument by which the condition of potential balance may be determined; then substituting in said circuit for the first mentioned resistance a circuit portion which includes said current measuring instrument and is of a conductivity equal to that of the first mentioned resistance and measuring the current flow through said circuit; then connecting said instrument in circuit with said thermo-couple and with a variable resistance and adjusting the latter to make the current flow through the circuit equal to that through said closed circuit in the preceding condition of the apparatus; and thereafter determining a temperature to which said couple is then subjected from the indication of said instrument.

4. Means for determining the temperature condition to which a thermo-couple is subjected, comprising in combination, means for establishing a circuit including a resistance, a source of current and a variable resistance and for connecting said thermo-couple in shunt to the first mentioned resistance, means for establishing a circuit differing from that first mentioned by the substitution for the first mentioned resistance of a circuit portion including a current measuring instrument and of a conductivity equal to that of the first mentioned resistance, and means for establishing a third circuit including said thermo-couple said instrument and a variable resistance.

5. Means for determining the temperature condition to which a thermo-couple is subjected, comprising in combination, means for establishing a circuit including a resistance, a source of current and a variable resistance and for connecting said thermo-couple in shunt to the first mentioned resistance, means for establishing a circuit differing from that first mentioned by the substitution for the first mentioned resistance of a circuit portion including a current measuring instrument and of a conductivity equal to that of the first mentioned resistance, and having the same temperature coefficient, and means for establishing a third circuit including said thermo-couple said instrument and a variable resistance.

6. Means for determining the temperature condition, to which a thermo-couple is subjected, comprising in combination means for establishing a circuit including a resistance, a source of current and a variable resistance, means for establishing a shunt to the first mentioned resistance including the thermo-couple and a current measuring device, means for establishing a circuit differing from the first mentioned circuit by the substitution therein for the first mentioned resistance, of a circuit portion including said current measuring device and of a conductivity equal to that of the first mentioned resistance, and means for establishing a third circuit including said thermo-couple said instrument and a variable resistance.

7. A pyrometric instrument, comprising in combination, a fixed resistance, a circuit portion including a current measuring device, a source of current, terminal conductors to which the terminals of a thermo-couple may be connected, variable resistance, and coöperating switch mechanism for establishing a circuit including in series said fixed resistance, said source of current and a determined portion of said variable resistance, and, provided said terminal conductors are externally connected through a thermo-couple, for establishing a shunt about said fixed resistance including said couple and said terminal conductors, and for establishing a second circuit differing from the first mentioned circuit by the substitution therein of said circuit portion for said fixed resistance, and for establishing a third circuit including said circuit portion, said terminal conductors, the thermo-couple connected thereto and a determined portion of said variable resistance.

8. A portable pyrometric instrument, comprising in combination, a fixed resistance, a circuit portion including a current measuring device, a source of current, terminal conductors to which the terminals of a thermo-couple may be connected, rheostatic means and coöperating switch mechanism for establishing a circuit including in series, said fixed resistance, said source of current and rheostatic means, and, provided said terminal conductors are externally connected through a thermo-couple, for establishing a shunt about said resistance including said couple, said conductors and said circuit portion, and for establishing a second circuit differing from the first mentioned circuit by the substitution therein of said circuit portion for said fixed resistance, and for establishing a third circuit including said circuit portion, said terminal conductors, the thermo-couple connected thereto and rheostatic means.

9. A means for determining the temperature condition to which a thermo-couple is subjected, comprising in combination, means for establishing a circuit including a resistance, a source of current, and a variable resistance, and for connecting said thermo-couple in shunt to the first mentioned resistance, means for establishing a circuit differing from that first mentioned by the substitution, for the first mentioned resistance, of a circuit portion including the winding of a current measuring instrument and a resistor, said first mentioned resistance comprising two portions, one equal in resistance to and having the same temperature coefficient as said instrument winding, and the other equal in resistance to, and having the same temperature coefficient as said resistor, and means for establishing a third circuit including said thermo-couple, said instrument and a variable resistance.

GEORGE W. W. CORNMAN.
RICHARD P. BROWN.